United States Patent [19]

Barczak

[11] Patent Number: 4,645,654

[45] Date of Patent: Feb. 24, 1987

[54] REDUCING SULFUR CONTENT IN FLUE GASES PRODUCED BY COAL COMBUSTION

[75] Inventor: Virgil J. Barczak, Oklahoma City, Okla.

[73] Assignee: Kerr-McGee Coal Corporation, Oklahoma City, Okla.

[21] Appl. No.: 425,262

[22] Filed: Sep. 28, 1982

[51] Int. Cl.[4] .......................... B01J 8/00; C01B 17/00
[52] U.S. Cl. .................................. 423/244; 110/343; 110/345
[58] Field of Search .......... 423/242 A, 242 R, 244 A, 423/244 R; 110/342, 343, 345, 347

[56] References Cited

U.S. PATENT DOCUMENTS

| | | | |
|---|---|---|---|
| 1,908,873 | 5/1933 | Tyrer | 423/569 |
| 1,917,685 | 7/1933 | Bacon et al. | 423/570 |
| 2,102,081 | 12/1937 | Lepsoe | 423/569 |
| 3,229,651 | 1/1966 | Wasp | 110/347 |
| 3,563,704 | 2/1971 | Torrence | 23/178 |
| 4,041,141 | 8/1977 | Moss | 423/571 |
| 4,060,589 | 9/1977 | Hass et al. | 423/244 |
| 4,071,606 | 1/1978 | Ratcliffe et al. | 423/569 |
| 4,095,953 | 6/1978 | Gutterman et al. | 23/277 R |
| 4,147,762 | 4/1979 | Steiner | 423/569 |
| 4,164,555 | 8/1979 | Steiner | 423/569 |
| 4,219,537 | 8/1980 | Steiner | 423/569 |
| 4,302,218 | 11/1981 | Friedman | 423/244 |
| 4,304,655 | 12/1981 | Poddar | 208/8 |
| 4,427,642 | 1/1984 | Arashi et al. | 423/244 |

FOREIGN PATENT DOCUMENTS 396969 8/1933 United Kingdom ................ 423/242

OTHER PUBLICATIONS

Description of Fluidized Bed Combustion Technology in Prior Art Statement.

*Primary Examiner*—Gregory A. Heller
*Attorney, Agent, or Firm*—William G. Addison

[57] ABSTRACT

A process for reducing the sulfur oxide content of flue gases produced by combustion of sulfur-containing coal containing cations of alkali metals, alkaline earth metals, or both, in ion exchangeable form. Flue gases containing sulfur oxides are recycled to contact coal awaiting combustion. Sulfur oxides are adsorbed on the coal during the contact step, react with alkali metal and alkaline earth metal cations, and are oxidized to form sulfate reaction products. When the treated coal is burned, these reaction products are retained in the coal ash.

23 Claims, 1 Drawing Figure

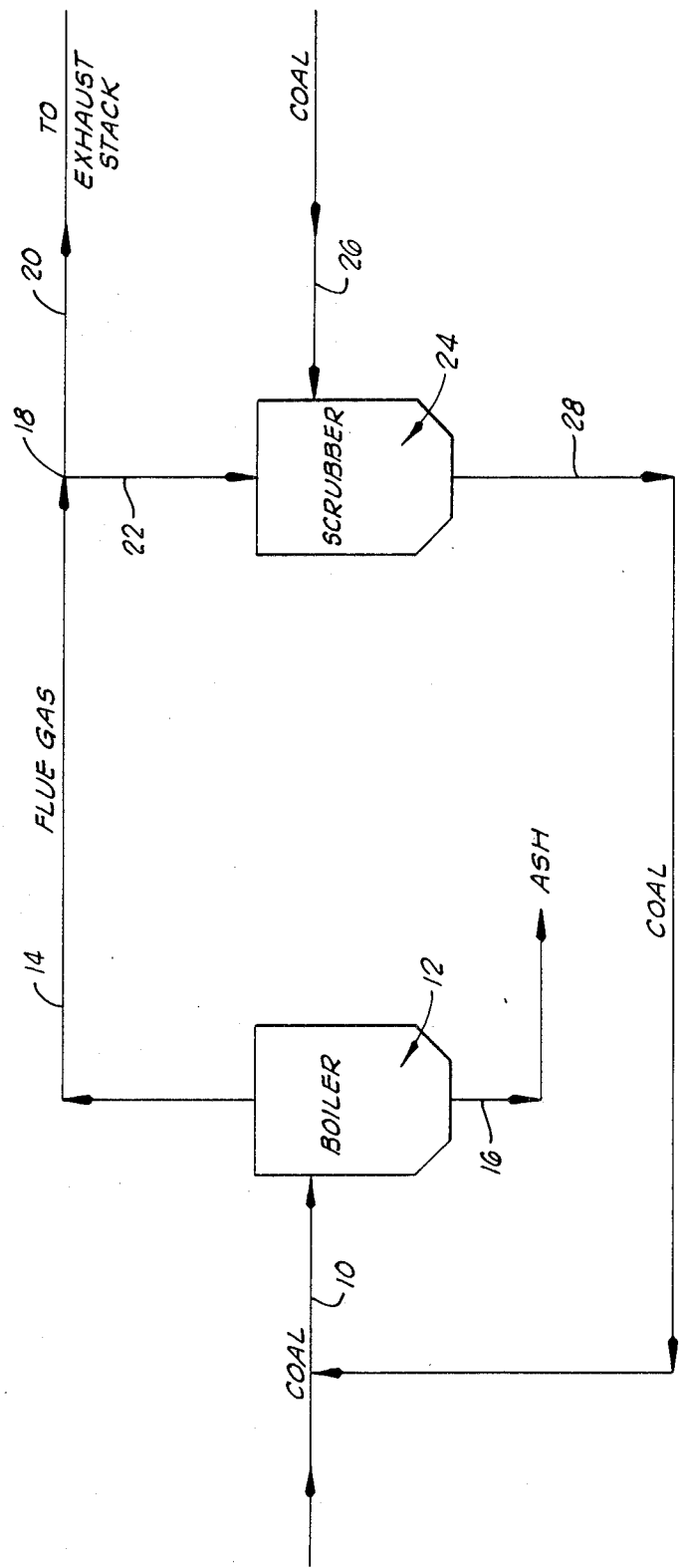

REDUCING SULFUR CONTENT IN FLUE GASES PRODUCED BY COAL COMBUSTION

CROSS REFERENCE TO RELATED APPLICATION

The subject matter of this application is related to that described in the copending application Process for Treating Coal to Reduce Sulfur Content in Flue Gases Produced by Coal Combustion, Ser. No. 425,263, filed Sept. 28, 1982, and assigned to the assignee of the present invention.

FIELD OF THE INVENTION

The present invention relates to methods for reducing the sulfur content, and more particularly the sulfur oxide content, of flue gases produced by combustion of coal.

BACKGROUND OF THE INVENTION

Sulfur-containing coals, when combusted, produce flue gases which contain sulfur oxides. Because environmental considerations dictate strict limitations on the amount of sulfur oxides which may be released to the atmosphere, considerable attention has been devoted by prior art workers to reducing the sulfur oxide levels in flue gases. Unless sulfur oxide levels in flue gases are reduced to acceptable levels, the flue gases produced by many types of coal cannot be released to the atmosphere. The prior art has generally focussed on reducing sulfur content in flue gases by reducing sulfur oxides either to elemental sulfur or to hydrogen sulfide.

BRIEF DESCRIPTION OF THE DRAWING

The FIGURE shows a schematic diagram of the flow of materials in the process of the present invention.

DESCRIPTION OF THE PREFERRED EMBODIMENT

The present invention comprises a process for reducing the sulfur oxide content of flue gases produced by burning of sulfur-containing coal. The coals with which this process may be practiced are characterized by the presence of cations of the alkali metals, alkaline earth metals, or both, in ion exchangeable form. Preferably these cations are present in a quantity in stoichiometric excess of the amount necessary to bind to the inherent sulfur in the coal. These cations preferably are in weakly bound form, and are not incorporated in minerals. Thus, for example, if all of the sulfur of the coal were present in the form of sulfate ions, and if all of the alkali or alkaline earth metal cations in the coal were calcium, then the calcium ion content of the coal should preferably exceed that necessary to bind to the sulfate ion content of the coal.

Deposits of lignite and subbituminous coals having the required composition are located in various areas of the United States, particularly in the western portion thereof. The approximate compositions of five such coals are shown in Table I. It will be noted that the alkali metal and alkaline earth metal elements are present in the coals described in Table I primarily in the form of calcium cations. A comparison of the calcium content with the sulfur content reveals a molar excess of calcium cations in four of these coals, as is preferred for practice of the present invention.

Table II shows the quantities of exchangeable cations present in two of the coal types characterized in Table I. These exchangeable cation quantities were measured for each type by adding a measured amount of ammonium acetate to an aqueous slurry of the coal, and then titrating the slurry for calcium, magnesium, sodium and potassium cations. The results shown in Table II indicate that most of the ion exchangeable cations are present as calcium in the coals tested.

TABLE I

| Coal Type | Rank | Mine Location | Ca (wt %) (dry basis) | Na (wt %) (dry basis) | S (wt %) (dry basis) | H$_2$O (wt %) | Ca/S mole ratio |
|---|---|---|---|---|---|---|---|
| 1 | Subbituminious | Wyoming | 1.0 | 0.1 | 0.7 | 28.3 | 1.15 |
| 2 | Subbituminious | Wyoming | 1.0 | 0.1 | 0.5 | 31.5 | 1.6 |
| 3 | Lignite | North Dakota | 1.2 | 0.7 | 0.6 | 30.7 | 1.6 |
| 4 | Subbituminious | Montana | 0.6 | 0.3 | 0.4 | 20.5 | 1.2 |
| 5 | Subbituminious | Wyoming | 0.33 | 0.03 | 0.5 | 20.4 | 0.5 |

TABLE II

| | Exchangeable cations (Millequivalents/100 g. coal) | |
|---|---|---|
| Cation | Type 1 Coal | Type 2 Coal |
| $Ca^+$ | 16.97 | 17.47 |
| $Mg^{++}$ | 6.99 | 8.64 |
| $Na^+$ | 0.87 | 2.61 |
| $K^+$ | 0.26 | 0.26 |
| | 25.09 | 28.98 |

Some coals may lack the inherent composition required for practice of the present invention. These coals may be treated by solutions of non-sulfur-containing salts of alkali metals or alkaline earth metals in order to render them suitable for use in the present invention. This treatment may be accomplished by spraying the coal with salt solution while the coal is dry, or by adding the salts to a coal-water slurry.

Suitable treatment agents for coal lacking the inherent composition necessary for practice of the present invention include sodium and calcium acetate. The amount of metal cations which may be absorbed by coal, in order to prepare it for use in the process of the present invention, is shown in Table III.

TABLE III

| Sample | Ca (wt. %) | Na (wt. %) |
|---|---|---|
| Untreated Coal | 1.05 | 0.06 |
| Coal in 10% solids slurry of 1N calcium acetate for 24 hours | 2.54 | — |
| Coal in 10% solids slurry of 1N sodium acetate for 24 hours | — | 1.10 |

With reference to the flow diagram shown in the FIGURE, the process of the present invention is practiced by burning coal in a combustion zone 12. Flue gases produced by combustion flow through a first line 14; a portion of these flue gases are recycled into a scrubbing zone 24, where the gases contact coal awaiting combustion. The coal adsorbs sulfur oxides from the flue gases; the coal is then transferred to the combustion zone 12. A portion of the sorbed sulfur from the scrubbing step remains as a sulfate-containing residue after the coal is burned. The process will now be described in greater detail.

With reference to the FIGURE, coal is transferred by means of a first conduit 10 into a combustion zone 12, such as a boiler. The first conduit 10 may comprise a conveyor, chute or other material transporting apparatus. In the combustion zone 12, the coal is burned to produce flue gases and an ash residue. The heat produced by this burning may be used conventionally to produce steam, for power generation or similar purposes.

The flue gases produced by burning the coal are permitted to leave the combustion zone 12 by the first line 14. The ash residue produced by the burning either leaves the combustion zone 12 as fly ash, or is removed from the combustion zone 12 by the second conduit 16. Like the first conduit 10, the second conduit 16 may comprise a conveyor, chute, or other material transporting apparatus.

When sulfur-containing coal is burned, some of the sulfur in the coal is oxidized to form sulfur oxides, such as sulfur dioxide and sulfur trioxide. These sulfur oxides are constituents of the flue gases which leave the combustion zone 12. As will be described in greater detail hereafter, the process of the present invention is directed to decreasing the sulfur oxide content of these flue gases, so as to render them suitable for release to the atmosphere.

The flue gases produced in the combustion zone 12 flow through the first line 14; at the junction 18, the flue gases are separated into two flue gas streams. A first flue gas stream is routed through a second line 20 to an exhaust stack (not shown). A second flue gas stream is routed through a third line 22 to a scrubbing zone 24, such as a scrubber.

In the scrubbing zone 24, the second flue gas stream is contacted with coal, which may be pulverized or in a coarser form. Pulverized coal is preferable for practice of the present invention, since it provides a larger surface area for contact with the flue gases. Coal may be transferred into the scrubbing zone 24 by means of a third conduit 26, which may comprise a chute, conveyor, or other material transporting apparatus.

When the second flue gas stream contacts the coal, sulfur oxides from the flue gas are adsorbed on the coal. It is believed that several different physical and chemical reactions take place during this step. First, some sulfur oxides react with organic molecules in the coal. Second, some sulfur oxides react with the alkali or alkaline earth metal cations in the coal. Third, sulfur dioxide and sulfite ions are oxidized to form sulfate ions. Thus, for example, if calcium cations are present in the coal, then the reaction of the coal with the sulfur dioxide from the flue gases results in production of calcium sulfate.

In the scrubbing zone 24, the coal may be received as a static coal bed, with the second flue gas stream passing therethrough. The second flue gas stream is caused to remain in the scrubbing zone 24 for a time sufficient to establish reactive contact between the second flue gas stream and the coal. A coal-gas contact time of between about 0.1 seconds and about 5 seconds will ordinarily be sufficient to establish the necessary reactive contact, although longer residence times may be used.

Alternatively, the coal may be received in the scrubbing zone 24 may be injected, in pulverized form, into the second flue gas stream as it enters the scrubbing zone 24. The second flue gas stream may thus fluidize the coal, and thereby enhance the degree of contact between the coal and the second flue gas stream. The velocity of the second flue gas stream must be sufficient to fluidize and entrain the pulverized coal for the time necessary to establish reactive contact between the coal and the flue gas—ordinarily between about 0.1 and about 5 seconds.

During the residence time of the second flue gas stream and coal in the scrubbing zone 24, the coal and gas are preferably maintained at a temperature between about 25° C. and about 500° C. Temperatures at the higher end of this range appear to result in higher retention of sulfur oxides by the coal.

After the completion of reactive contact between coal and the second flue gas stream in the scrubbing zone 24, the treated coal, and preferably the second flue gas stream, are transferred from the scrubbing zone 24 to the combustion zone 12 by a fourth conduit 28. In the embodiment shown in the FIGURE, the fourth conduit 28 is shown as delivering treated coal to the first conduit 10, which in turn delivers the treated coal to the combustion zone 10. Alternatively, the fourth conduit may be arranged to deliver treated coal directly to the combustion zone 12.

The fourth conduit 28 may comprise a conveyor, chute or other material transporting apparatus. If the treated coal is caused to be entrained and fluidized by the second flue gas stream while in the scrubbing zone 24, then the fourth conduit 28 may be used to direct the second flue gas stream, and its entrained coal, to the combustion zone 12. In this event, the fourth conduit 28 will preferably be substantially fluid-tight. It will be understood that, if the fourth conduit 28 is used to direct coal entrained by the second flue gas stream, then the scrubbing zone 24 and the fourth conduit 28 may be substantially or entirely co-extensive. In other words, reactive contact between the pulverized coal and the second flue gas stream may be accomplished in the fourth conduit 28 at the same time as the coal is being transferred to the combustion zone 12.

Treated coal transferred by the fourth conduit 28 is delivered to the combustion zone 12 where, together with untreated coal received from the first conduit 10, it is burned in the combustion zone 12. During the burning process, alkali metal and alkaline earth metal cations in the coal react with sulfur oxides generated during the burning to form alkali metal and alkaline earth metal sulfates. These sulfates formed in the combustion zone 12, together with the sulfates formed in the scrubbing zone 24, are deposited in the combustion zone 12 as a solid sulfate-containing residue. For example, if the coal contains calcium cations, then the reaction product of these cations with sulfur dioxide will be calcium sulfate, which will be deposited as a solid residue in the combustion zone 12. The sulfate-containing residue not leaving the combustion zone 12 as fly ash is removed via the second conduit 16.

It should be understood that it would be possible to reduce the sulfur oxide content of flue gases without burning of the coal with which these gases have been treated in the scrubbing zone 24. However, economic factors will generally dictate that the treated coal be burned so that its thermal content may be utilized.

In some instances, the inherent sulfur content of coal may include volatile sulfur compounds. During combustion, these volatile compounds may be driven from the combustion zone 12 in unoxidized form. Since the process of the present invention depends on the presence of sulfur oxides in the flue gases, the sulfur in these of Type 1 coal were subjected to the same treatment, but at different temperatures. The treated samples were analyzed for sulfur content, were examined by X-ray diffraction for calcium-bearing phases, and were then burned. The quantity of ash and the sulfur content of the ash was determined.

The results of these runs are summarized in Table IV.

TABLE IV

|  | Reaction Temp. (°C.) | Unburned Coal | | Burned Coal | |
| --- | --- | --- | --- | --- | --- |
|  |  | Sulfur in Coal (wt. %) | Calcium Bearing Phases Detected by X-Ray Diffraction | Ash (wt. %) | Sulfur in Ash (wt. %) |
| Untreated Sample | — | 0.57 | None | 5.60 | 8.08 |
| $SO_2$ Treated Samples | 100° C. | 3.54 | $CaSO_4 \cdot H_2O$ | 6.36 | 11.2 |
|  | 200° C. | 3.56 | — | 6.69 | 11.9 |
|  | 300° C. | 18.4 | — | 6.17 | 12.6 |
|  | 400° C. | 25.6 | — | 6.97 | 12.2 |
|  | 500° C. | 28.2 | $CaSO_4$ | 8.02 | 10.8 | unoxidized volatiles may not be removed from flue gases by the present invention. In this event, it may be desirable to oxidize the sulfur-containing volatiles, such as by heating the flue gases in the presence of excess oxygen or air, before the flue gases are used to treat coal pursuant to the present invention. This will permit removal of more of the sulfur content of the flue gases than would otherwise be possible.

Although not shown in the FIGURE, the process of the present invention may be used in conjunction with other pollution control equipment. For example, the flue gas products of the combustion zone 12, either before or after they arrive at the junction 18, may be passed through an electrostatic precipitator, a baghouse, or the like as required to render the flue gas products suitable for atmospheric release.

From the foregoing description, it will be understood that the process of the present invention may be practiced as a continuous process. A portion of the flue gases from the combustion of coal are continuously recycled to treat coal which is awaiting combustion. The alkali metal and alkaline earth metal cations in the coal react with the sulfur oxides in the flue gas, which are oxidized to form sulfate reaction products. As the treated coal is burned, these reaction products are deposited in the combustion zone as a sulfate-containing residue. This residue is discharged from the combustion zone as bottoms or as fly ash. Thus, the net result of the process is to remove gaseous sulfur oxides from the flue gases, and to convert them into solid sulfate-containing residues. The quantity of flue gas diverted into the second flue gas stream may be varied as required to decrease the ultimate atmospheric release of sulfur oxides in the first flue gas stream to desired levels.

The following examples demonstrate the effectiveness of the process of the present invention.

EXAMPLE 1

A 2 gram sample of untreated coal of the Type 1 described in Table I was analyzed for sulfur content. Examination of the coal by X-ray diffraction failed to reveal the presence of calcium-bearing phases. The coal was then burned, and the quantity of ash, and the sulfur content of that ash, were determined.

A 2 gram sample of pulverized Type 1 coal was placed in a vertical column and treated with pure $SO_2$ gas, which was passed at a constant flow rate through the column for 30 minutes. Additional 2 gram samples The results indicate that considerable quantities of sulfur may be retained in the unburned samples of Type 1 coal. Upon burning, however, much of this sulfur is not retained in the ash. Nevertheless, more sulfur is retained in the ash of treated samples than is present in the ash of the untreated sample. The presence of calcium sulfate in the unburned treated samples suggests that the sulfur in the ash is retained as calcium sulfate.

EXAMPLE 2

A 2 gram sample of Type 1 coal was treated with 100% $SO_2$ in a vertical column at 100° C. for 10 minutes. Additional 2 gram samples of Type 1 coal were subjected to the same treatment, but for different reaction times. All of the treated samples were analyzed for sulfur content, as was a dry, untreated sample.

The results are summarized in Table V.

TABLE V

|  | Reaction Time (Minutes) | Total Sulfur in Sample (wt. %) |
| --- | --- | --- |
| Untreated Sample | — | 0.67 |
| $SO_2$ Treated Samples | 10 | 2.66 |
|  | 20 | 3.07 |
|  | 40 | 3.99 |

EXAMPLE 3

A 5 gram 4×6 mesh sample of untreated coal of the Type 2 described in Table I was analyzed for sulfur content. The sample was then burned, and the quantity and sulfur content of the ash were determined.

A 5 gram 4×6 mesh sample of Type 2 coal was placed in a vertical column. A synthetic flue gas consisting of 98% $CO_2$ and 2% $SO_2$ was passed through the sample for 1 hour. The gas flow rates were 590 ml/minute $CO_2$ and 12 ml/minute $SO_2$. The runs were repeated at differing temperatures. The treated samples were then burned, and the quantity and sulfur content of the ash were determined.

The results are summarized in Table VI.

TABLE VI

| | Reaction Temp. (°C.) | Unburned Coal Sulfur in Coal (wt. %) | Burned Coal Ash (wt. %) | Burned Coal Sulfur in Ash (wt. %) |
|---|---|---|---|---|
| Untreated Sample | — | 0.41 | 6.35 | 4.62 |
| SO₂ Treated Samples | 100° C. | 1.11 | 8.74 | 8.37 |
| | 200° C. | 1.83 | 10.2 | 9.32 |
| | 300° C. | 2.70 | 10.8 | 10.7 |
| | 400° C. | 8.32 | 14.6 | 8.95 |

These results indicate that the process of the present invention may be practiced with relatively coarse coals, and with relatively low concentrations of sulfur oxides in the flue gases.

EXAMPLE 4

A 5 gram sample of pulverized Type 1 coal was analyzed for sulfur content. The sample was then burned, and the quantity of ash and the sulfur content of the ash were determined.

A pulverized 5 gram sample of Type 1 coal was placed in a vertical column and exposed for 1 hour to a synthetic flue gas passing therethrough. The synthetic flue gas consisted of 98% $CO_2$, with a flow rate of 590 ml/minute, and 2% $SO_2$, with a flow rate of 12 ml/minute. Identical runs were carried out with additional 5 gram samples of Type 1 coal, but at differing low temperatures. The treated samples were then burned, and the quantity of ash and the sulfur content of the ash in each sample were determined. The results are summarized in Table VII.

TABLE VII

| | Reaction Temp. (°C.) | Unburned Coal Sulfur in Coal (wt. %) | Burned Coal Ash (wt. %) | Burned Coal Sulfur in Ash (wt. %) |
|---|---|---|---|---|
| Untreated Sample | — | 0.44 (dry) | 6.26 | 3.72 |
| SO₂ Treated Samples | Ambient | 1.48 | 6.36 | 10.8 |
| | 50 | 1.39 | 6.46 | 11.5 |
| | 75 | 1.39 | 7.05 | 8.29 |
| | 100 | 1.25 | 7.35 | 10.3 |
| | 150 | 1.20 | 7.76 | 9.19 |

These results indicate that appreciable amounts of adsorbed sulfur may be retained in ash after combustion even when the coal-flue gas reaction is carried out at relatively low temperatures.

EXAMPLE 5

Type 2 coal was combusted in both horizontal and vertical beds. The gases produced by this combustion were then passed through a vertical column of Type 2 coal. The amount of sulfur recovered by scrubbing the combustion gases was determined by comparing sulfur content of the column coal before and after treatment with gases. The sulfur content of the bed coal was likewise determined before and after combustion.

During some of the runs, the flue gas from the combustion reaction was heated in the presence of excess air, in order to assure oxidation of any sulfurous volatiles in the gas, prior to treatment with the coal column. The results of these runs are summarized in Table VIII.

TABLE VIII

| Bed Position of Combustion Coal | Off-gas from Combusted Coal Mixed With Excess Air in Heated Reaction Chamber? | Amount of Sulfur from Recovered Flue Gas (wt. %) |
|---|---|---|
| Horizontal | no | 0 |
| Horizontal | no | 0 |
| Horizontal | yes | 4.0 |
| Horizontal | yes | 15.7 |
| Vertical | yes | 1.2 |
| Vertical | yes | 7.7 |
| Vertical | yes | 3.7 |

These results confirm that the process of the present invention may be practiced with actual, as well as synthetic, flue gas streams.

EXAMPLE 6

Synthetic flue gas streams having low concentrations of $SO_2$ were passed through vertical columns of Type 2 coal. The columns of coal were contained in 1 inch glass tubes heated to 200° C. by an external furnace. After treatment with the synthetic flue gas, the coal was combusted, and its ash analyzed to determine the amount of $SO_2$ retained in the ash. The results are summarized in Table IX.

These results show that the process of the present invention may be practiced with flue gases having relatively low sulfur oxide concentrations, and with relatively short gas-coal contact times.

EXAMPLE 7

Samples of undried baghouse fines of Type 2 coal were reacted with synthetic flue gas consisting of 99.81% $N_2$ and 0.19% $SO_2$, at 150° C. Baghouse fines have a finer particle size (50% less than 325 mesh), and contain more sulfur (0.94% versus 0.55%) than the run-of-the mine coal used in the other Examples. The reactions were conducted in both static and fluid beds. After treatment, each coal sample was burned, and the resulting ash was analyzed. The results are summarized in Table X. These results indicate that fluidized bed conditions significantly improve the adsorption of sulfur oxides by coal. In either a static or a fluidized bed, however, significant amounts of the sorbed sulfur are retained in the coal ash.

Changes may be made in the construction, operation and arrangement of the various parts, elements, steps and procedures described herein without departing from the spirit and scope of the invention as defined in the following claims.

TABLE IX

| Carrier Gas | SO₂ Concentration in Gas (ppm) | Diameter of Reaction Tube (in.) | Bed Position of Scrubber Coal | Long Dimension of Coal Co. (in.) | Gas-Coal Contact Time (sec.) | Percentage of SO₂ Recovery From Gas |
|---|---|---|---|---|---|---|
| CO₂ | 1150 | 1 | Vertical | 2.5 | 0.4 | 0 |
| CO₂ | 1900 | 1 | Vertical | 3.7 | 0.7 | 4.3 |
| N₂ | 1900 | 1 | Vertical | 3.7 | 0.5 | 3.2 |
| CO₂ | 1900 | 1 | Vertical | 7 | 1.5 | 11.9 |
| N₂ | 1900 | 1 | Vertical | 7 | 1.0 | 11.9 |

TABLE IX-continued

| Carrier Gas | SO$_2$ Concentration in Gas (ppm) | Diameter of Reaction Tube (in.) | Bed Position of Scrubber Coal | Long Dimension of Coal Co. (in.) | Gas-Coal Contact Time (sec.) | Percentage of SO$_2$ Recovery From Gas |
|---|---|---|---|---|---|---|
| CO$_2$ | 3800 | 1 | Vertical | 7 | 1.5 | 10.8 |
| N$_2$ | 3800 | 1 | Vertical | 7 | 1.0 | 28.0 |
| CO$_2$ | 7600 | 1 | Vertical | 7 | 1.5 | 21.7 |
| N$_2$ | 7600 | 1 | Vertical | 7 | 1.0 | 9.8 |
| CO$_2$ | 1900 | 2 | Horizontal | 5.5 | 4.7 | 9.0 |
| N$_2$ | 1900 | 2 | Horizontal | 6 | 3.3 | 14.1 |
| CO$_2$ | 1900 | 2½ | Horizontal | 3.8 | 4.3 | 31.2 |
| 97% N$_2$ + 3% O$_2$ | 1900 | 2½ | Vertical | 6.8 | 4.9 | 29.2* |

*The 6 × 40 mesh fraction was analyzed separately from the 40 × 100 mesh fraction. The fines fraction contained 58% more sulfur than the coarse fraction. Assuming the head sulfur content of the fines and coarse fractions were identical, analyses indicate that if the entire sample consisted of fines, 38.4% of the SO$_2$ would have been recovered.

TABLE X

| Type Reactor | Coal Gas Contact Time (seconds) | Percentage of SO$_2$ Recovery From Gas | Percentage of Inherent Sulfur Reporting to Ash | Percentage of Sorbed Sulfur Reporting to Ash |
|---|---|---|---|---|
| Fixed Bed | 8 | 30 | 80 | 51 |
| Fixed Bed | 4 | 31 | 87 | 55 |
| Fluid Bed | 4[1] | 97 | 88 | 46 |
| Fluid Bed | 4[1] | 100 | 65 | 62 |
| Fluid Bed | 4[1] | 82 | 57 | 28 |

[1]Estimated average contact time; maximum contact time was approximately 30 seconds.

What is claimed is:

1. A process for reducing the gaseous sulfur oxide content of flue gases comprising the steps of:
   burning in a combustion zone coal containing weakly bound cations of one of the alkali metal and alkaline earth metals or combinations thereof in ion exchangeable form thereby producing flue gases, the burning of such coal in the combustion zone causing a substantial portion of the sulfur dioxide in the coal to be converted to sulfates in a residue in the combustion zone thereby reducing the amount of gaseous sulfur dioxide in the flue gases produced in the combustion zone;
   recovering the sulfate containing residue from the combustion zone;
   contacting at least a portion of the flue gases with coal containing weakly bound cations of one of the alkali metal and alkaline earth metals or combinations thereof in ion exchangeable form in a scrubbing zone to sorb a portion of the sulfur dioxide in the contacted flue gases on the coal; and
   combusting in the combustion zone the coal contacted by the flue gases in the scrubbing zone.

2. The process of claim 1 in which the coal contains weakly bound cations in ion exchangeable form of one of the alkali metals and alkaline earth metals or combinations thereof in stoichiometric excess of the amount necessary to bind with the sulfur inherent in the coal.

3. The process of claim 1 in which the coal contains weakly bound cations of calcium in ion exchangeable form.

4. The process of claim 2 in which the coal is sub-bituminious.

5. The process of claim 2 in which the coal is lignite.

6. The process of claim 2 in which the coal contains weakly bound cations of calcium in ion exchangeable form.

7. The process of claim 1 in which the flue gases produced in the combustion zone are heated in the presence of excess oxygen prior to contacting at least a portion of the flue gases with coal in the scrubbing zone.

8. The process of claim 1 in which the scrubbing zone is maintained at a temperature of between about 25° C. and about 500° C.

9. The process of claim 1 in which the coal contacts at least a portion of the flue gases in the scrubbing zone for a period of at least about 0.1 seconds.

10. The process of claim 1 defined further to include the step of:
    separating the flue gases produced in the combustion zone into a first flue gas stream and a second flue gas stream; and
    wherein the step of contacting at least a portion of the flue gases with coal is defined further as contacting the second flue gas stream with the coal.

11. The process of claim 10 in which the second flue gas stream entrains the coal and transfers the coal from the scrubbing zone toward the combustion zone.

12. The process of claim 11 in which the coal contains weakly bound cations in ion exchangeable form of one of the alkali metals and alkaline earth metals or combinations thereof in stoichiometric excess of the amount necessary to bind with the sulfur inherent in the coal.

13. The process of claim 11 in which the coal contains weakly bound cations of calcium in ion exchangeable form.

14. The process of claim 12 in which the coal is sub-bitumious.

15. The process of claim 12 in which the coal is lignite.

16. The process of claim 12 in which the coal contains weakly bound cations of calcium in ion exchangeable form.

17. The process of claim 11 in which the coal is fluidized while in the scrubbing zone.

18. The process of claim 10 in which the coal is fluidized by the second flue gas stream while in the scrubbing zone.

19. The process of claim 18 in which the coal contains weakly bound cations in ion exchangeable form of one of the alkali metals and alkaline earth metals or combinations thereof in stoichiometric excess of the amount necessary to bind with the sulfur inherent in the coal.

20. The process of claim 18 in which the coal contains weakly bound cations of calcium in ion exchangeable form.

21. The process of claim 19 in which the coal is subbituminous.

22. The process of claim 19 in which the coal is lignite.

23. The process of claim 19 in which the coal contains weakly bound cations of calcium in ion exchangeable form.

* * * * *